(12) United States Patent
Hawthorne (10) Patent No.: US 8,753,521 B2
(45) Date of Patent: Jun. 17, 2014

(54) OFFSHORE OIL SPILL REMEDIATION AND RECOVERY SYSTEM

(75) Inventor: Namon A. Hawthorne, Miami, OK (US)

(73) Assignee: Namon A. Hawthorne, Miami, OK (US)

(*) Notice: Subject to any disclaimer, the term of this patent is extended or adjusted under 35 U.S.C. 154(b) by 233 days.

(21) Appl. No.: 13/134,567

(22) Filed: Jun. 9, 2011

(65) Prior Publication Data

US 2011/0309031 A1    Dec. 22, 2011

Related U.S. Application Data

(60) Provisional application No. 61/397,331, filed on Jun. 10, 2010.

(51) Int. Cl.
  C02F 1/40    (2006.01)
  E02B 15/04    (2006.01)
  B01D 17/04    (2006.01)
  C02F 101/32    (2006.01)
  C02F 103/00    (2006.01)

(52) U.S. Cl.
  CPC ............... C02F 1/40 (2013.01); E02B 15/046 (2013.01); B01D 17/041 (2013.01); B01D 17/045 (2013.01); C02F 2101/32 (2013.01); C02F 2103/007 (2013.01); Y10S 210/923 (2013.01)
  USPC ................ 210/747.5; 210/170.11; 210/923

(58) Field of Classification Search
  USPC ......... 210/747.5, 747.6, 776, 170.05, 170.09, 210/170.1, 170.11, 242.3, 923
  See application file for complete search history.

(56) References Cited

U.S. PATENT DOCUMENTS

| | | | | |
|---|---|---|---|---|
| 3,823,828 | A | * | 7/1974 | Derzhavets et al. ....... 210/242.3 |
| 3,966,615 | A | * | 6/1976 | Petchul et al. ................ 210/776 |
| 4,033,876 | A | * | 7/1977 | Cocjin et al. ............... 210/242.3 |
| 4,428,319 | A | * | 1/1984 | Henning et al. ........... 210/242.3 |
| 4,851,133 | A | * | 7/1989 | Rymal ......................... 210/776 |
| 4,921,605 | A | * | 5/1990 | Chastan-Bagnis et al. ... 210/923 |
| 5,122,283 | A | * | 6/1992 | Wells ............................ 210/776 |
| 5,441,638 | A | * | 8/1995 | Tillich ..................... 210/170.05 |

* cited by examiner

*Primary Examiner* — Christopher Upton
(74) *Attorney, Agent, or Firm* — Michael Hetherington, Attorney at Law (57) ABSTRACT

An offshore water-hydrocarbon separator system is capable of entrapping spilled oil offshore, and recovering the oil to a usable state for subsequent refining. The kinetic energy of a towing vessel provides the energy for establishing a flow path of oil and seawater through the hydrocarbon separator. Annular venturi provided at each successive stage in the separator accelerate a core flow of sea water substantially down the center of the flow path, while drag associated with aggregated oil particles forces oil outward, away from the core, to flow along the walls of each stage. The energy that establishes the core flow of water is provided by the kinetic energy of the surface vessel and the acceleration of core flow at each successive venturi. No other source of energy is needed to induce the water hydrocarbon separation.

7 Claims, 5 Drawing Sheets

OFFSHORE OIL SPILL REMEDIATION AND RECOVERY SYSTEM

CROSS REFERENCE TO RELATED APPLICATION

This patent application claims the benefit of U.S. Provisional Application 61/397,331 filed Jun. 10, 2010.

BACKGROUND

1. Field of the Invention

The field of the invention relates generally to remediation and recovery of useful amounts of oil from offshore oil spills in which crude oil is dispersed, emulsified, aggregated, or otherwise entrained beneath the surface. In particular, the field of the invention relates to a cost effective system for recovery of useful amounts of spilled crude oil through subsurface separation based on the difference in specific gravity between the oil and the sea water.

2. Background of Related Art

Oil spill remediation techniques have failed to keep pace with recent advances in offshore oil drilling technology. Deep-sea drilling technology now exists that enables crude oil extraction at previously unattainable depths. Drilling may be accomplished from an anchored, stable floating deep-sea platform, such as at least one platform in the Gulf of Mexico (Peridido) operating at depths in excess of 2400 meters. anchored, stable floating deep-sea platform, such as at least one platform in the Gulf of Mexico (Peridido) operating at depths in excess of 2400 meters.

Oil spills, particularly those far offshore, and in deep water, are substantially inaccessible to recovery by conventional methods. Spills form deep water wells, particularly when the oil aggregates through sedimentation, may not rise to the surface, and may have serious long term consequences for marine life and marine based economies, and adversely impact the food supply derived from the ocean.

Conventional Remediation Practices do not Work in Deep Offshore Oil Spills.

Over forty years after the Santa Barbara oil spill, conventional remediation measures remain substantially unchanged and ineffectual, and generally are limited to enclosing floating spilled oil with floating booms, skimming oil off the surface, dispersing oil with chemicals, or soaking it up with straw or other absorbent materials when it reaches the shore.

However, choppy water, ocean waves, and strong winds can make it substantially impossible to use the foregoing conventional methods to contain an offshore oil spill. Further, due to the density of crude oil and tendency of oil molecules to agglomerate, sinking may occur due to the adhesion of particles of sediment or organic matter to the oil. In a massive deep ocean offshore spill a majority of the spilled oil may remain submerged below the surface. Such submerged masses of oil are incapable of being contained, much less recovered, by conventional oil spill remediation technology.

Conventional Centrifugal Water-Oil Separation Methods are Prohibitive Due to Cost, Mechanical Complexity, Limited Form Factor, and Undue Energy Consumption.

Conventional centrifugal water-oil separators have serious disadvantages when applied to deep-water recovery of spilled oil that remains submerged below the ocean surface. A centrifugal water-oil separator is a conventional device designed to separate oil and water by centrifugation. It generally contains a cylindrical container that rotates inside a larger stationary container. The denser liquid, usually water, accumulates at the periphery of the rotating container and is collected from the side of the device. The less dense flowable material, usually oil, accumulates at the rotation axis and is collected from the center. See for example; U.S. Pat. Nos. 4,175,040, 4,959,158, and 5,591,340.

Such conventional centrifugation systems have serious disadvantages making them inapplicable for offshore recovery of oil in deep water. The centrifuge devices are mechanically complex and consume considerable energy to rotate the cylindrical container filled with oil and water. Also, such machines are oriented vertically and would need to be deployed on a surface vessel or barge. Thus, their form factor would be limited by necessity. The limited availability of energy offshore, in deep ocean, further would render such devices incapable of performing widespread remediation and recovery of a major, deep water, submerged oil spill.

Submerged oil must be pumped up to such a conventional centrifugal oil-water separator system, thus requiring complex pumping equipment, consuming even more energy in the pumping process, and necessitating additional equipment for underwater containment or entrapment of the oil for pumping. The amount of energy for such a pumping operation would need to be provided by a surface vessel and would prohibit cost effective separation of oil and sea water.

Therefore, what is needed is a new system for offshore oil spill remediation that can be used in deep ocean water, where most of the spilled oil remains submerged below the surface.

What is also needed is a system that is capable not only of entrapping the spilled oil offshore, before it reaches land, but is capable of recovering the oil to a usable state for subsequent refining. Such usable recovery of oil would minimize economic losses associated with the spilled oil itself, and would enable an oil company to recover value from the presently wasted oil. The ability to recover the spilled oil to a usable state also would provide an economic incentive to clean up as much spilled oil as possible.

It also would be desirable to provide a cost effective, system for separating and recovering the oil in a single operation at any desired depth—without the need for an external energy source; saving the energy for pumping the recovered, separated oil to a surface vessel for direct transport to a refining center.

SUMMARY

In order to achieve the foregoing and other objectives, a first aspect of the invention comprises an offshore water-hydrocarbon separator system comprising generally a cylinder capable of being towed by a vessel having a desired amount of kinetic energy, such as a tug boat, small ship, or the like, through a submerged mass of spilled oil. The cylinder has an outer hull, an interior core, an inlet, and an outlet end. The inner core defines a flow path having a desired velocity from the inlet to the outlet. The inner core further comprises a plurality of serially connected cylindrical segments or stages, each stage having a narrower diameter than a preceding stage upstream in the flow path. An annular venturi is disposed around the periphery of the outlet end of each stage, where the outlet of a first stage joins the narrower diameter inlet of a successive, downstream stage.

As the vessel pulls the water-hydrocarbon separator through a submerged mass of oil, the inlet end of the cylinder entrains the oil and seawater and establishes a flow path for oil and water defined by the successive stages through the interior core of the hydrocarbon separator. The kinetic energy of the towing vessel provides the energy for establishing the flow path of oil and seawater through the cylinder. The annular venturi that are provided at each successive stage accelerate a core flow of sea water substantially down the center of the flow path, while the drag associated with aggregated oil or particles of crude oil forces the oil outward away from the core to flow along the walls of each stage.

In accordance with an aspect of the invention, the energy that establishes the core flow of water through the water-hydrocarbon separator is provided only by the towing action/kinetic energy of the surface vessel and the acceleration of core flow at each successive venturi. As explained below, no other source of energy is needed to induce the water hydrocarbon separation.

The successively spaced annular venturi provided at the outlet end of each connected stage accelerate the mixed oil and water flow into the adjacent downstream stage in the flow path defined in the interior core of the water-hydrocarbon separator. Each successive venturi comprises a progressively narrower diameter opening at the inlet end of downstream each stage. Upon acceleration of the input flow to a sufficient velocity, the flow path of oil and water through each stage develops laminar flow. The oil, due to heavier viscosity and the tendency of oil molecules to agglomerate, moves outward and adheres to the surface of the walls of the interior core, where it is drawn off at annular venturi openings defined at the peripheral end of each stage, conducted to a containment port, pumped to the surface, and recovered in tanks. The annular venturi also accelerate the lighter viscosity water into a core flow substantially through the center of the flowpath to a successive stage.

The only input energy required, other than the kinetic energy of the towing vessel, is that required for pumping the separated, contained oil to the surface. The water-hydrocarbon separation process is accomplished by the acceleration action associated with the venturi at each stage of the core. No other source of energy is required.

The present water-hydrocarbon separation system has no moving parts, can be constructed cost effectively, and scaled in size to accommodate major offshore spills and recover significant quantities of submerged oil. In as much as there are no moving parts, and no energy requirement other than the towing vessel, such a system can operate continuously.

In another aspect, the hydrocarbon separator system comprises generally a long cylinder of variable length, about 10 ft. or more in diameter, having an intake end and outlet end and an inner core of successive, connected stages defining a flow path for the oil and water entrained therein. The inlet end of the core is streamlined for entraining a maximum mass of oil into the flow path and also is provided with a series of flow controlling surfaces such as curved vanes located on the interior surface of the inlet and core for inducing helical or corkscrew flow along the flow path defined through the successive stages.

In accordance with another aspect of the invention, an annular venturi is disposed at the outlet end of each stage forming the interior core. Corresponding oil collector tanks are provided around the core of the cylinder and coupled with the output of each venturi for collection of the oil as it flows along the interior walls of each connected stage. The collector tanks are pumped to develop low pressure at the venturi. The higher viscosity, highly agglomerated oil is forced outward along the metal walls of the interior surface of the core stages and slows down in contact with the metal. Laminar flow develops between the heavier viscosity oil and the seawater. The oil is then drawn off the walls by each annular venturi at the downstream outlet of each connected stage, and pumped from the collector tanks to the surface. The progressively narrow diameter stages further accelerate a core flow of seawater down the center of the flow path.

In another aspect, the exterior surface of the cylinder is provided with a series of control surfaces such as vanes and controllable ballast tanks that enable the water-hydrocarbon separator to be maneuvered easily and submerged to a desired depth.

A buoy stabilizer system enables the hydrocarbon separator to be towed efficiently without undesirable pitch or yaw through subsurface areas where a maximum mass of spilled oil may be located. At extreme depths, the control surfaces aid submerged navigation, and increase stability and speed. On board sensors measure pressure and laminar flow in the hydrocarbon separator core and send corrective output signals to the control surfaces and a control system on the towing ship to maintain or increase speed and/or depth of the tow line so as to optimize laminar flow in the hydrocarbon separator core and maximize recovery of subsurface oil.

DETAILED DESCRIPTION

In the following detailed description of the preferred embodiments, reference is made to the accompanying drawings, which form a part hereof, and in which are shown by way of illustration specific embodiments in which the invention may be practiced. The drawings are heuristic for clarity. It is to be understood that other embodiments may be utilized and structural changes may be made without departing from the scope of the present invention.

The term "oil" as used in this disclosure should be interpreted broadly to include petroleum or hydrocarbons in all naturally occurring states.

Figure 1:
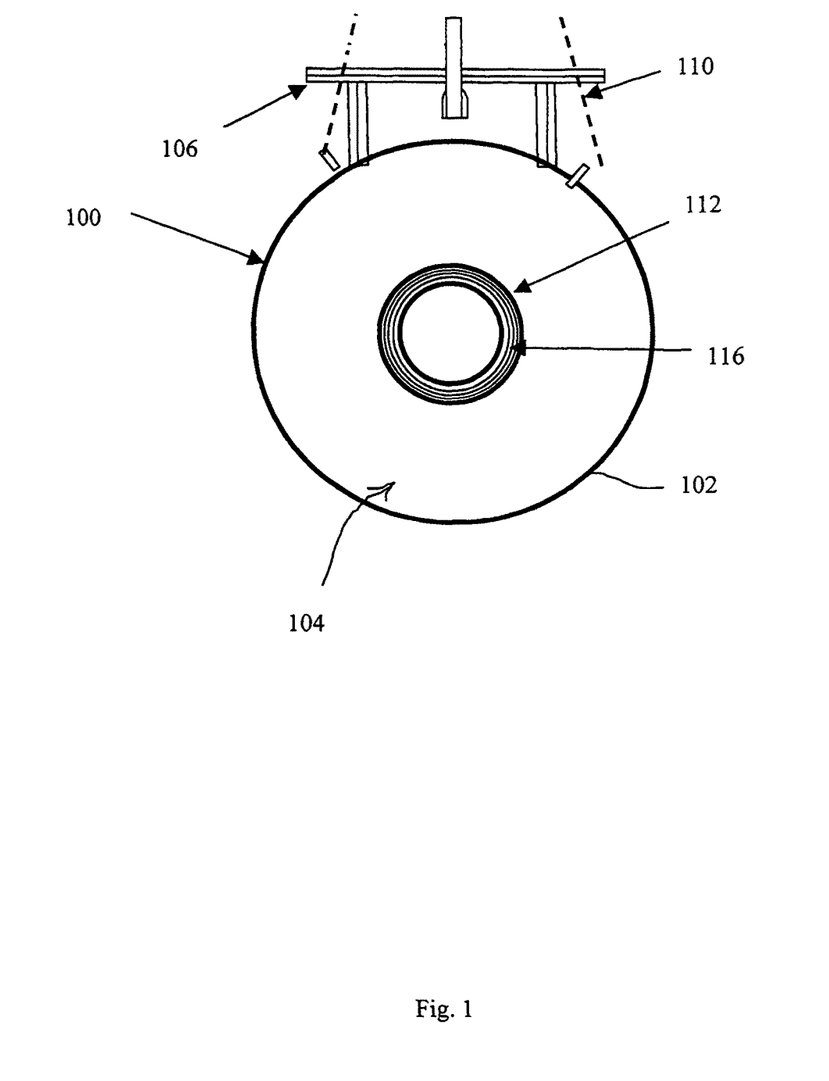
FIG. 1 is a schematic front view of an offshore oil remediation and separation system, showing the central bore for establishing a flow path and the exterior control surfaces for underwater navigation according to an embodiment of the present invention.
Figure 2:
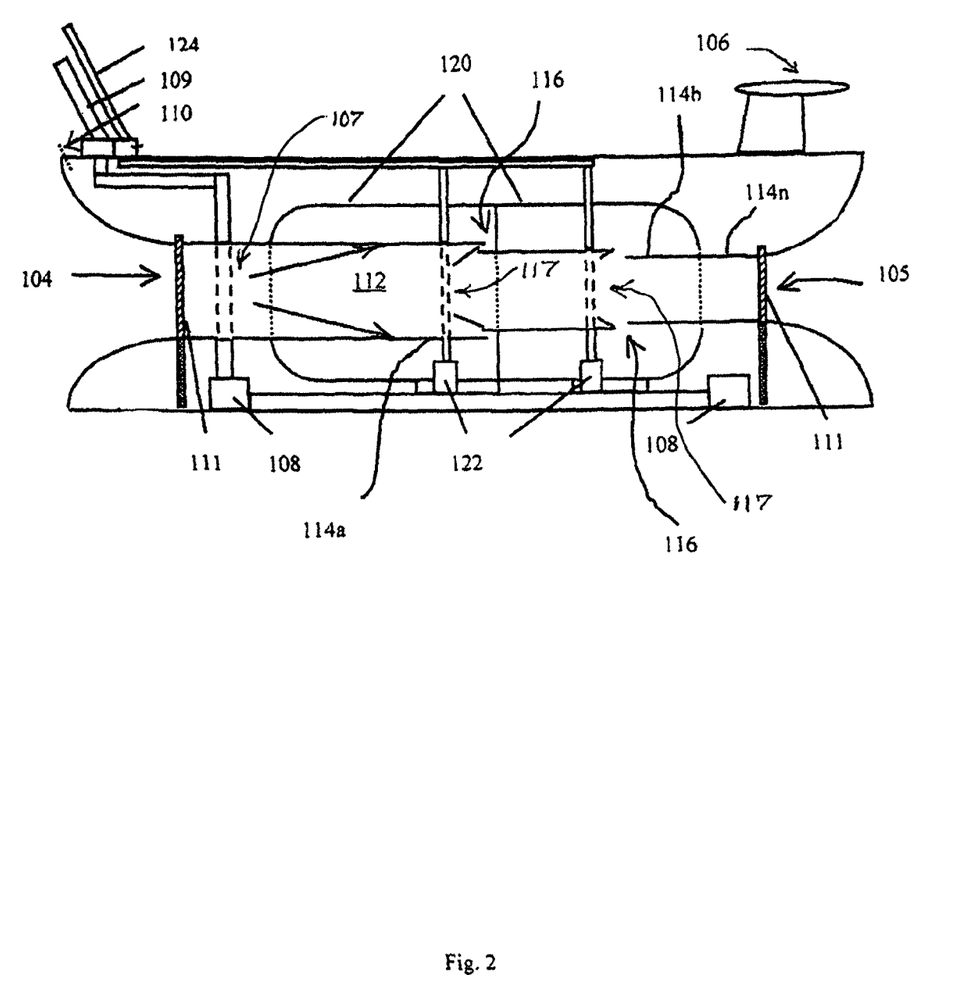
FIG. 2 is a schematic side sectional view of an offshore oil remediation and separation system, showing exterior control surfaces for underwater navigation and interior cylindrical stages provided with a venturi at the outlet of each stage for accelerating the flow of oil and water to develop laminar flow according to an embodiment of the present invention.

Referring to FIGS. 1, and 2, an offshore oil spill remediation and hydrocarbon separation system comprises a generally cylindrical vessel 100 having an outer hull 102 defining an inlet 104 for enveloping a submerged mass of oil mixed with seawater and an outlet 105. Vessel 100 is provided with a stabilizer and trim tab assembly 106. The stabilizer and trim assembly operate in a well-known manner to stabilize the vessel against yaw and/or rotational forces. Together with ballast pumps and containers 108 the stabilizer and trim assembly enable the vessel to be controllably submerged. Ballast pumps are controlled by water ballast line 109. Tow cables 110 are provided for attachment to a surface vessel for towing the vessel 100 through a subsurface oil plume at sufficient velocity such that laminar flow is developed in the core. Watertight doors 111 are provided at the inlet and outlet ports of the vessel 100. The watertight doors are closed when the vessel is in port to allow the vessel to float and be easily transportable.

Inlet 104 has a streamlined design to impact a mass of submerged oil at a velocity sufficient to entrain the oil into a flow path defined in an inner core 112. Inner core 112 comprises a plurality of serially connected or concatenated cylinders of progressively narrowing diameter. These are referred to herein as stages or core stages 114a, 114b, . . . 114n.

The number of core stages can be varied depending upon the length of the vessel 100. However, at least three core stages 114a, 114b, 114n are necessary for effective oil/water separation to occur. Each stage is connected to a preceding upstream stage at a venturi, 117. Each stage is characterized by an inlet having a smaller diameter than the outlet of the preceding, adjacent stage upstream in the flow path. The successive venturi at the output of each stage, progressively accelerate the flow of oil and water, such that a core flow of seawater is developed at each successive, downstream stage. As many as seven cores or stages readily may be implemented.

The difference in diameters between the outlet of a first stage such as 114a and the narrower inlet of a successive adjacent downstream stage 114b also forms an annular venturi 117. Venturi 117 defines an annular gap 116. Annular gap 116 acts as a peripheral venturi at the outlet of the upstream stage. Each annular gap 116 has a connection with a corresponding oil collector tank 120. Oil collector tanks 120 are pumped by oil recovery pumps 122 to maintain a low-pressure drop at each venturi sufficient to extract or draw the oil through the annular gap 116 and into the collector tanks. The extracted oil is then pumped through oil recovery line 124 to a surface ship or tank for transport and refining.

Once the oil/water flow attains sufficient velocity in the inner core 112, water/oil phase separation occurs through the difference in gravities of the water and the oil. Oil flows outward toward the metal wall of core 112 as shown by the arrows indicating flow vectors of oil in core 112 in FIG. 2. The progressively narrowing diameter of the core stages 114a, 114b, 114n accelerate the flow of water at the inlet of each successive stage in the core. In a case wherein seawater is dispersed through the oil in small particles, separation may be aided by adding additional stages and passing the oil/water mixture through additional corresponding venturi at the inlet of each corresponding stage.

The interior metal surface of the core 112 forms a rigid boundary that slows down the heavier viscosity oil in the oil/water flow path. At the inlet of each stage, the annular venturi 116 develop a low pressure drop that is sufficient to draw in and extract the oil that accumulates and flows along the interior surface of the walls of core 112.

Referring to FIG. 2; arrows indicating flow vectors of oil in core 112 and into annular gap 116. The venturi at 117 at the inlet of each successive downstream stage 114b, 114n also accelerates water toward the center of the core and aids in maintaining a boundary layer and laminar flow between the low viscosity water and the heavier viscosity oil flowing along the interior metal surface of the core.

The successive annular venturi 117 and annular openings 116 arranged around the periphery at the outlet of each stage 114a, 114b maintain laminar flow between oil and water within the core as long as the vessel is towed at sufficient velocity. Depending on the length of the vessel 100 and the submerged depth, a sufficient velocity to maintain laminar flow is in a range of about 10-30 knots and most preferably about 20 knots.

Operational Parameters

Figure 3:
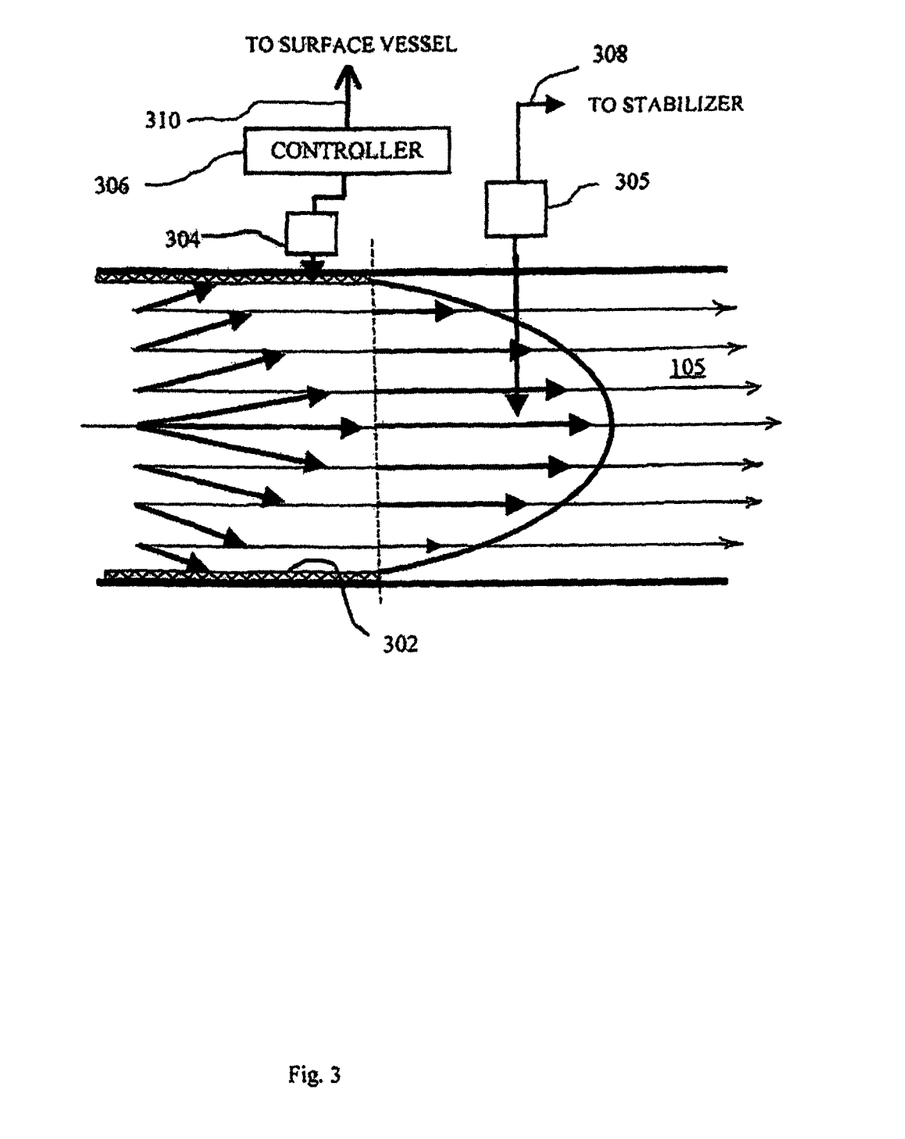
FIG. 3 is a schematic view of flow vectors, and oil/water separation in an oil extraction core according to an embodiment of the present invention.

FIG. 3 shows an example of flow vectors (indicated by arrows) of oil in the inlet 104 of the interior core 112, and seawater at outlet 105. Due to heavier viscosity and the tendency of hydrocarbon molecules to agglomerate, oil tends to move outward toward the walls of cores 112 that define the flow path. The oil slows down against the metal walls and forms a boundary layer 302 and develops or is characterized by laminar flow with respect to the seawater.

The oil boundary layer continues to grow as the lighter viscosity water is accelerated down the center core of the flow path. The water thus develops a higher velocity core flow with respect to the oil, that tens to flow outward along the walls of the cores. Annular venturi openings located at the periphery of each outlet stage or core. The width of the annular opening 116 defined by venturi 117 is preferably on the order of ½ inch. If the widths of the venturi gaps are much greater than this, too much water may enter the opening 116 and the pumping tanks.

In order to maintain proper towing speed and adequate laminar flow/separation of oil and water within the core, a control system with active feedback continuously monitors pressure at points within the core to communicate to the towing vessel that laminar flow is occurring within the core and at an appropriate rate for optimal oil extraction. Well known pressure transducers such as pitot tubes, gamma sensors, or the like, measure pressure at appropriate points in the core and communicate with a micro controller, that in turn translates the pressure readings to output signals representative of an optimal towing velocity.

Referring to FIG. 3, velocity pressure in the core extraction tube can be found by measuring the difference of the pressures between two pressure transducers, such as pitot tubes 304 and 305, that are simultaneously measuring static and linear pressures. There is a distinct drop in pressure within the laminar flow that can be measured in relation to the viscosity of the hydrocarbon flow along the wall of the core 112 and the water flowing in the center of the flow path defined within in the core.

Velocity pressure can be found by measuring the difference of the pressures between the two pressure transducers. A first pressure transducer such as pitot tube 304 is positioned to measure pressure at the intake 104 aft of the watertight door 111 at the interior wall of the core 112. A second pressure transducer and second pitot tube 305 is positioned in the outlet 105 aft of the outlet watertight door 111 to measure pressure substantially in the center of the flow path for sea water.

The two pressure transducers 304, 305 measure static and linear pressures. The pressure transducers are communicatively linked with a controller 306, such as a computer, or the like in accordance with well-known techniques. The controller 306 continuously, or at desired regular intervals, monitors the pressure transducers' measurements to determine the optimal core pressures and corresponding velocity for maintaining oil/water separation in the core 112. The controller also compares measured pressure readings with respect to a look up table of known optimal pressure readings and corresponding optimal towing velocities, and provides corrective feedback signals over wireless or wired communication link 308 to adjust the stabilizer and trim assembly 106, the ballast pumps 108, and/or the speed of the surface towing vessel.

The controller also communicates output signals to a control system on the towing vessel over communication link 310. The output signals are representative of the optimal towing velocity for maintaining oil separation and extraction based on a measured density and depth of the oil to be recovered. For example, hydrocarbons are typically lighter than water, which would tend to transfer lighter weight oil into the center of the core extraction tube. However, hydrocarbons in the Gulf of Mexico spill are not readily coming to the surface and are seeking a deep equilibrium under the surface of the water. Such heavy and viscous hydrocarbons would tend to adhere to the sides of the core and empty into the recovery tanks at slower velocities. Therefore, the controller's output signals, based on measured static and velocity pressures will allow the towing vessel to maintain the optimum operational oil recovery speed at any depth.

In operation, a preferred towing velocity for the hydrocarbon separator is in a range of from about to 18-20 feet per second. At this rate, the hydrocarbon separator extracts about one pint of oil per cubic foot of mixed oil and seawater. The streamlined shape of the intake 104 enables approximately 90-95 percent of the oil impacted by the intake to be recovered. The streamlined intake develops a flow path wherein the oil tends to move outward and adhere to the metal walls of the segmented core stages, thereby forming a boundary layer that is extracted by the successive annular venturi.

Figure 4:
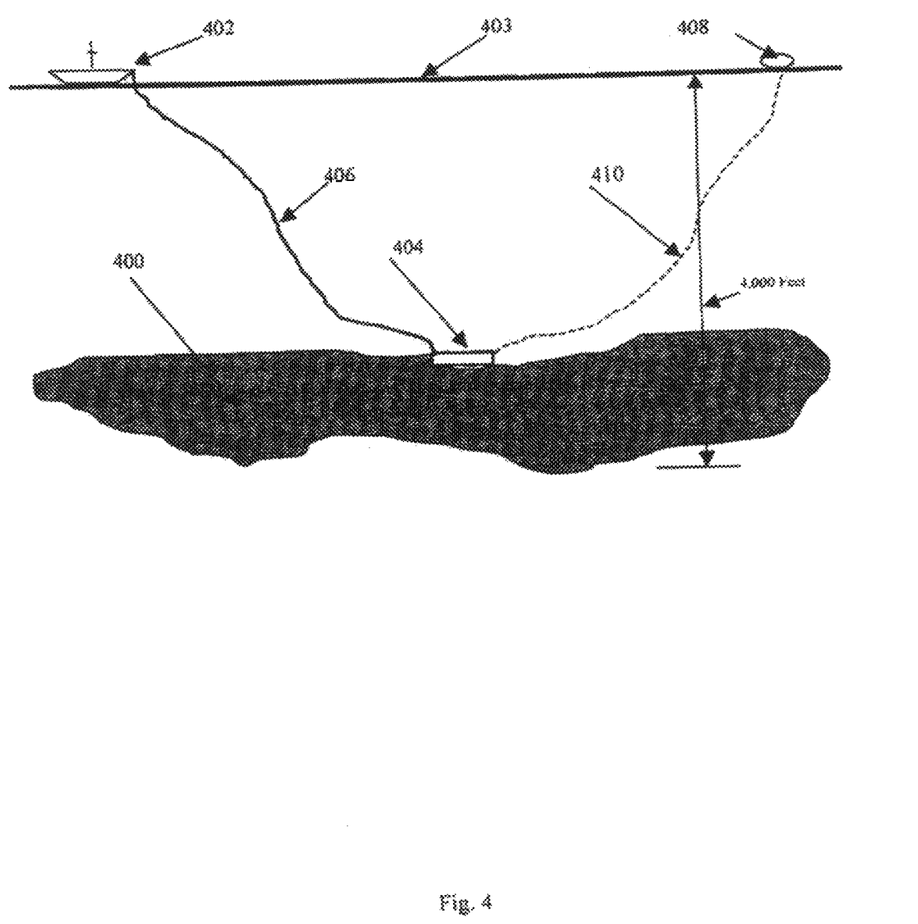
FIG. 4 is a schematic view of a buoy stabilizer system for operation at extreme depths according to an embodiment of the present invention.

An application of the present invention for deep ocean oil recovery is shown in FIG. 4. In this example, a deep hydrocarbon plume 400 exists in a flowable state at extreme depth. A towing vessel 402 at ocean surface 403 tows the hydrocarbon separator system 404 through the hydrocarbon plume 400 by means of a tow cable 404 attached at the inlet end of the hydrocarbon separator system. Associated with the tow cable 406 are oil recovery lines for receiving oil pumped to the surface from the tanks in the hydrocarbon separator, and electrical control lines for communication between the sensors in the extractor core of the hydrocarbon separator and the control system on the towing vessel 402 to maintain an optimal towing speed as a function of measured laminar flow in the extraction core as previously explained. Also associated with the tow cable 406 are control lines for robotic vision and for control of the ballast tanks and stabilizer and trim assembly on the hydrocarbon separator 404. In accordance with an aspect of the invention, a buoy 408 is attached to the opposite or outlet end of the hydrocarbon separator 404 with respect to the tow cable. The buoy stabilizer cable 410 stabilizes the hydrocarbon separator at great depths against yaw, and advantageously maintains the pitch of the hydrocarbon separator in a desired plane.

Figure 5:
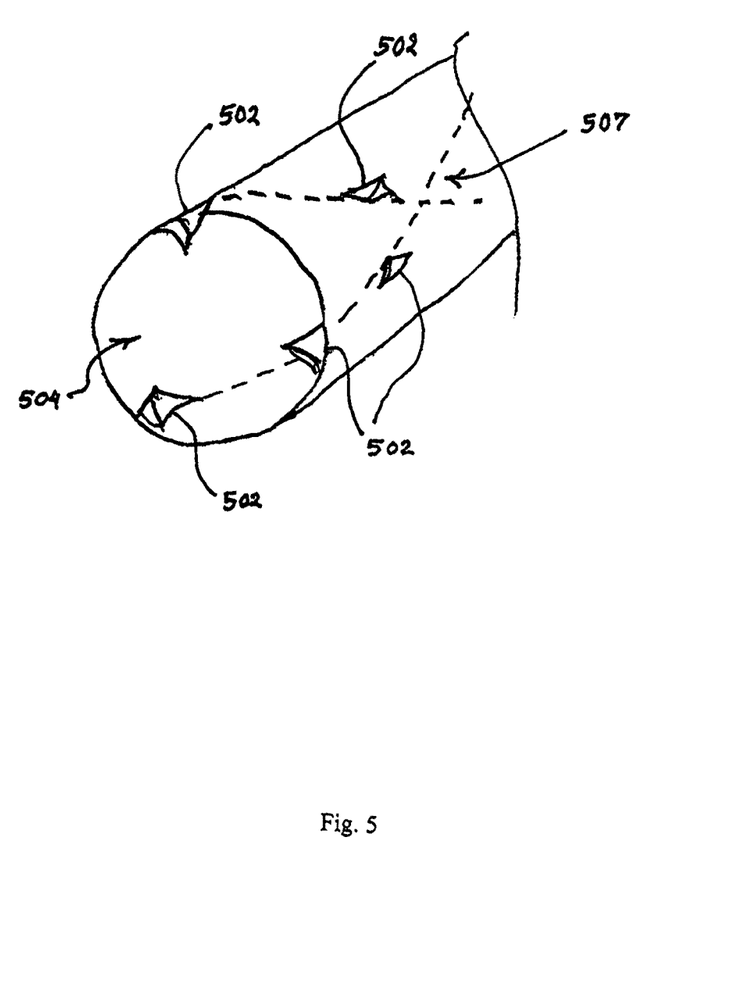
FIG. 5 is a schematic view of a conventional means for inducing helical flow or corkscrew flow in a cylinder, to further induce drag of aggregated oil particles along the walls of the core stages of the water-oil separation system in accordance with an aspect of the invention.

FIG. 5 shows a non-limiting example of flow control surfaces that may be provided on the interior surfaces of the core stages of the present invention for inducing helical or corkscrew flow. It is known from Austrian Patent No. 134543 that helical or corkscrew flow may be induced by adding flow control surfaces, such as at 502, on the interior walls of a cylinder 500. Helical or corkscrew flow (507) induced by such flow control surfaces advantageously induces a concentric, core flow of water and causes heavier entrained particles to flow outward against cylinder walls.

Accordingly, as a non limiting example, any convenient number of flow control surfaces 502 as shown in FIG. 5 may provided on the inlet 504 of the water hydrocarbon separator and/or on the interior surfaces of each core stage. Control surfaces 502 induce corkscrew or helical flow as shown by dotted lines 507 in a well-known manner. Helical flow enhances core flow of seawater concentrically down the center of each stage, and causes heavier oil particles to aggregates against the interior walls of each core stage 112. Oil on the interior walls is then drawn off through the annular gap 116 (as shown in FIG. 2) defined by each venturi 117 to storage tanks for pumping to the surface as previously described.

While the invention has been described in connection with what is presently considered to be the most practical and preferred embodiments, it is to be understood that the invention is not limited to the disclosed embodiments, but on the contrary is intended to cover various obvious modifications and equivalent arrangements.

For example, the present oil recovery system may be constructed or augmented with advanced, high compressive strength metals or composite materials so that all sections including ballast tanks and oil recovery tanks can be exposed to substantial pressures of the ocean at extreme depths. In this manner danger of the system being crushed by high water pressures is substantially reduced, and the depth in which the recovery system can operate is almost unlimited.

Also, the oil extraction core geometry need not be limited to a cylinder, but may be for example, a generally elongate tube with polygonal sides. What is necessary is that there be a sufficient number of connected stages of reduced diameter for defining a flow path. Each successive stage is characterized by a narrower diameter inlet than the adjacent outlet of the preceding stage. A substantially annular or otherwise peripheral venturi is provided at the outlet end of each preceding stage defining a peripheral annular gap for pulling off the oil layer along the walls of each stage. The outlet venturi at each stage accelerates the core flow of water into each succeeding stage. In this manner, towing the water-hydrocarbon separation system provides the basic energy, amplified at each venturi, for accelerating the flow of oil and core flow of water along the flow path such that oil/water separation occurs. A core flow of water occurs, and due to increased drag of oil particles, a boundary layer of oil forms on the interior surface of the walls each stage, such that oil is drawn into each venturi, collected and pumped to the surface.

Therefore, persons of ordinary skill in this field are to understand that all such equivalent structures are to be included within the scope of the present invention.

The invention claimed is:

1. A water-hydrocarbon separator for separating and recovering crude oil from water in offshore environments comprising:
   a cylinder; comprising an outer hull, a multi stage interior core, an inlet, and an outlet end, the outer hull capable of being towed by a vessel through a submerged mass of spilled oil at a desired kinetic energy sufficient to establish a flow path of oil and water through the multi stage interior core;
   the interior core further comprising a plurality of serially connected cylindrical stages, each stage having an inlet and outlet, wherein the inlet of each successive stage is characterized by a narrower diameter than the adjacent outlet of a preceding upstream stage in the flow path; an annular venturi disposed around the periphery of the outlet end of each stage for accelerating the flow of oil and water into each successive stage and for conducting oil aggregated on the surface of interior core to a containment tank.

2. A water-hydrocarbon separator as in claim 1, wherein the hull is provided with a series of control surfaces that enable the water-hydrocarbon separator to be maneuvered easily and submerged to a desired depth.

3. A water-hydrocarbon separator as in claim 2, wherein the hull control surfaces comprise vanes.

4. A water-hydrocarbon separator as in claim 2, wherein the hull control surfaces comprise ballast tanks.

5. A water-hydrocarbon separator as in claim 1, further comprising a buoy stabilizer system comprising:
- a first cable connected to substantially the center of the hull for towing by the surface vessel;
- a second cable having a first end attached to the hull in line with and downstream or aft of the first cable, and having a second end attached to a buoy for enabling the hydrocarbon separator to be towed without undesirable pitch or yaw through subsurface areas where a maximum mass of spilled oil may be located.

6. A water-hydrocarbon separator for separating and recovering crude oil from water in offshore environments comprising:
- an outer hull, defining a multi stage interior core having an inlet, and an outlet end, the hull capable of being towed by a vessel through a submerged mass of spilled oil at a desired kinetic energy sufficient to establish a flow path of oil and water defined in the multi stage interior core;
- the interior core further comprising a plurality of serially connected stages, each stage having an inlet and outlet, wherein the outlet of a first stage is characterized by a wider diameter than the inlet of a second serially connected stage downstream in the flow path;
- an annular venturi provided around the periphery of the outlet end of each stage for accelerating a core flow of water into the connected downstream stage and for conducting oil aggregated on the surface of the interior core to a containment tank.

7. A method for separating and recovering hydrocarbons, such as crude oil from sea water in offshore environments comprising:
- towing a submerged core defining an interior core with a vessel having a kinetic energy sufficient to establish a flow path of oil and water defined through the interior of the core;
- accelerating the flow of oil and water through a series of successively spaced annular venturi provided in interior of the core;
- developing a higher velocity core flow of water along the center of the flow path at the output of each venturi;
- developing a boundary layer of oil on the interior surface of the core due to increased drag of oil particles, such that oil is drawn off the surface at each venturi to a containment tank; and pumping the contained oil from a surface vessel for recovery.

* * * * *